March 4, 1924.

J. F. O'CONNOR 1,485,806

BRAKE FOR RAILWAY CARS

Filed Jan. 23, 1920

Witnesses
Wm. Geiger

Inventor
John F. O'Connor
By Geo. J. Haight
His Atty.

Patented Mar. 4, 1924.

1,485,806

UNITED STATES PATENT OFFICE.

JOHN F. O'CONNOR, OF CHICAGO, ILLINOIS, ASSIGNOR TO WILLIAM H. MINER, OF CHAZY, NEW YORK.

BRAKE FOR RAILWAY CARS.

Application filed January 23, 1920. Serial No. 353,417.

*To all whom it may concern:*

Be it known that I, JOHN F. O'CONNOR, a citizen of the United States, residing at Chicago, in the county of Cook and State of Illinois, have invented a certain new and useful Improvement in Brakes for Railway Cars, of which the following is a full, clear, concise, and exact description, reference being had to the accompanying drawings, forming a part of this specification.

This invention relates to improvements in brakes for railway cars.

The object of my invention is to provide an efficient hand brake for railway cars having means which will positively insure the complete release of the brakes.

Figure 1:
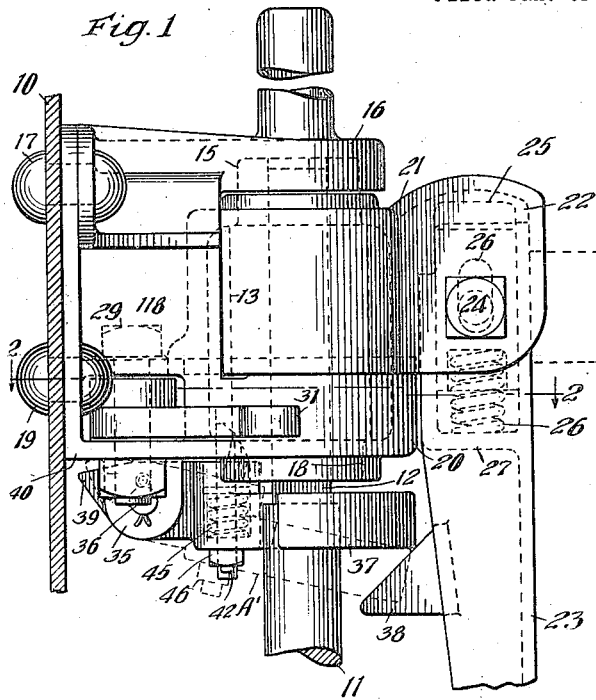
Figure 3:
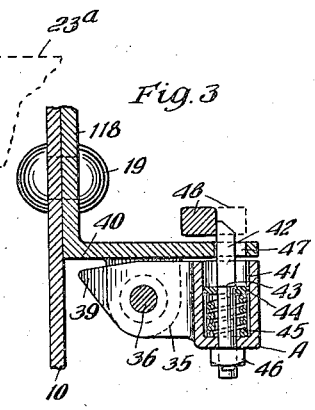
Figure 4:
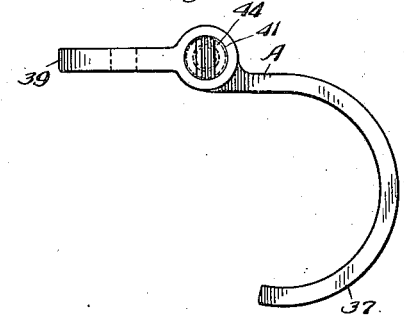
Figure 2:
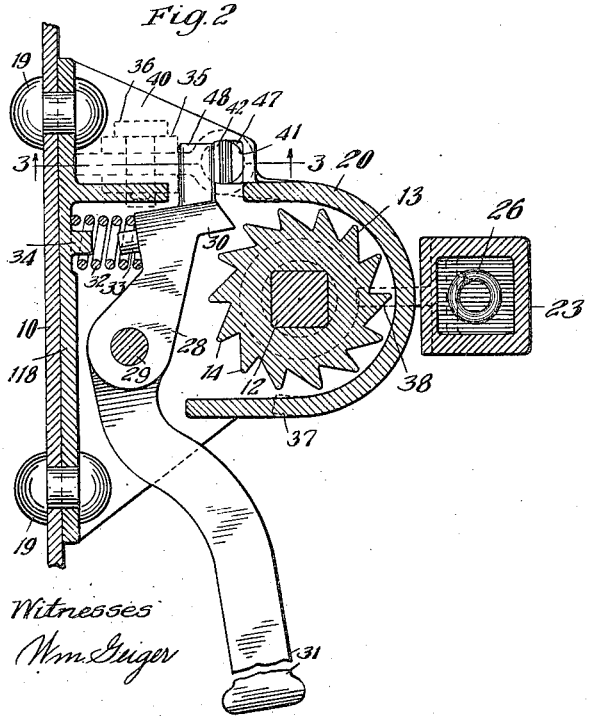

In the drawings forming a part of this specification, Figure 1 is a broken elevational view of a hand brake showing my improvements in connection therewith, a portion of a car wall to which certain parts of the brake are attached being shown in section. Figure 2 is a horizontal sectional view taken substantially on the line 2—2 of Figure 1. Figure 3 is a detail sectional view taken substantially on the line 3—3 of Figure 2. And Figure 4 is a detail view of the locking dog controller lever employed in my construction.

In said drawings, 10 denotes a portion of wall of a car, to which certain parts of my improved brake are secured. The brake shown is of that type employing a vertical staff 11 around the bottom of which or on a drum carried thereby the brake chain will be wound as customary. The upper end of the brake staff 11 has a squared section 12 which carries a ratchet wheel 13 of considerable height, the same having peripheral teeth 14. The ratchet wheel 13 has an upper bearing section 15 rotatably seated in a bracket 16 which is riveted to the car wall as by the rivets 17. The lower end of the ratchet wheel 13 is formed with another bearing section 18 which is journaled in a housing bracket 118 also riveted to the car wall as indicated at 19. The housing bracket 118 has an upstanding flange 20 suitably formed to partially house the ratchet wheel 13 and thereby protect it from the weather. Rotatably mounted on the ratchet wheel 13 is a carrier 21 of substantially cylindrical form which, in conjunction with the flange 20 and overhanging part of the bracket 16 forms the complete housing for the ratchet wheel. The carrier 21 is provided with a laterally extended hollow arm 22 within which is pivotally mounted an operating lever or handle 23 on a pivot bolt 24. The upper end of the operating handle 23 is made of substantially hollow rectangular form and has slidably mounted therein a pawl 25, the pawl 25 having an elongated slot 26 through which passes the pivot bolt 24, the latter serving to limit the outward movements of the pawl 25 as will be understood. A spring 26 is seated within the handle 23, the same bearing against a partition 27 in the handle and against the pawl 25 so as to normally project it upwardly or outwardly. With the construction shown, it is evident that the handle 23 will normally assume a depending vertical inoperative position but when elevated to the dotted position as indicated at 23ª, the pawl 25 will be brought into operative relation with the ratchet wheel 13 and the brake staff 11 may be operated to wind up the chain.

Cooperable with the ratchet wheel 13 near its lower end is a locking dog 28 pivotally mounted on a bolt 29 carried by the housing bracket 18. The dog 28 has a tooth 30 which is adapted normally to engage the teeth 14 to hold the ratchet wheel and staff 11 against rotation. The dog has a handle 31 which is extended laterally or outwardly to one side by which it may be manually operated and disengaged from the ratchet wheel. The dog 28 is normally held in operative position with respect to the ratchet wheel by means of a spring 32, one end of which is seated over a small lug 33 carried on the back of the dog 28 and the other end seated over a corresponding lug 34 formed on the bracket 118. With the construction thus far described, it is evident that the ratchet wheel will slip under the dog 28 but will be held against reverse rotation in a well-known manner.

In order to hold the locking dog 28 in inoperative position after the brake has been released to thus insure the brake shoes and all parts of the brake returning to a fully released position as they are jarred or vibrated while the car is in motion, I employ the following arrangement. The housing bracket 118 is provided with a pair of depending spaced ears or lugs 35—35 between which is pivoted a lever designated generally by the reference A. Said lever A is pivoted on a suitable pin or bolt 36. The lever A is extended outwardly toward the handle 23 and has a curved arm 37 which extends around the staff 11, said curved arm 37 being positioned so as to cooperate with a wedge-shaped lug 38 carried by the handle 23. The arm 37 is made of such length that the wedge-shaped lug will come into contact with it when the handle 23 drops to its vertical position regardless of the angular position of the carrier 21 and handle 23 with respect to the staff 11. That is to say, the handle 23 may be released so as to fall to a vertical position at any point within a relatively large arc, which, in the construction shown, approximates 180° but regardless of this position, the lug 38 will engage the under side of the curved arm 37 and wedge or cam it upwardly to the full line position shown in Figure 1. The dotted lines A' in Figure 1 indicate the position which the lever A will assume while the brake is being operated and the downward movement of said lever A to the dotted position shown is limited by an extension 39 carried at its inner end which will engage the under side of a horizontal web 40 of the housing bracket 118.

The lever A is provided with a cylindrical socket 41 closed at the bottom and open at the top and within which is slidably mounted a latch 42. The latter is shouldered at 43 and against the shouldered portion bears a washer 44, a spring 45 being interposed between said washer and the bottom wall of the socket in the lever A. The latch 42 carries a suitable nut 46 at its lower end to limit its upward movement under the influence of the spring 45. The latch 42 is adapted to project upwardly through an opening 47 provided in said bottom web 40 of the housing bracket 18 and to cooperate with a lug or extension 48 carried by the dog 28.

The operation is as follows: Assuming the parts in the position shown by the full lines in Figure 1, that is with the latch 42 projected upwardly in front of the lug 48 so as to hold the locking dog 28 in inoperative position, when the brakeman desires to set the brakes, he lifts the handle 23 to its horizontal position and proceeds to rotate the staff 11 step by step in a well known manner. By raising the handle 23, the lever A is released and is permitted to fall down so that the latch 42 passes out of engagement with the lug 48 of the locking dog 28 and the tooth of the latter is then projected into operative position with the wheel 13. Consequently, during the winding operation, the locking dog 28 functions in its usual manner. After the brake has been applied sufficiently, the operator releases the handle 23 and the latter falls to its depending vertical position under the influence of gravity. The wedge lug 38 on the handle then engages the lever A and lifts it to the full line position shown in Figure 1. The latch 42 carried by the lever A will be projected upwardly through the opening 47 but will engage the under flat side of the dog lug 48 and consequently does not affect the dog. When the brakeman releases the brake, he of course disengages the dog from the ratchet wheel and in so doing pulls the dog to such a position that the latch 42 is projected upwardly in front of the lug 48 as shown in Figures 2 and 3, thereby holding the dog in its inoperative position until the brake is again brought into use. By holding the locking dog in its inoperative position, the staff and all other parts of the brake are automatically left free to gradually work themselves to a fully released position as they are jarred or vibrated while the car is in movement and thereby eliminate possibility of partial release due to brakemen failing to hold the locking dog in release position as long as they should.

With the construction hereinbefore described, it is evident that the operator is not required to pay any attention to the means for holding the latch in inoperative position but operates the brake in the usual manner. It will also be noted that the latch cannot come into action while the brake is being applied nor until the brake is actually released.

Although I have herein shown and described what I now consider the preferred manner of carrying out the invention, the same is merely illustrative and I contemplate all such changes and modifications as come within the scope of the claims appended hereto.

I claim:

1. In a hand brake for railway cars having a brake chain and a rotatable member for tensioning the brake chain, the combination with means for effecting rotation of said member to tension the chain, including an operating element therefor having movement about the axis of said rotatable member and being movable at right angles thereto to operative and in-operative positions; of automatically controlled means for normally locking said member against reverse rotation and adapted to be manually operated to release said member; means co-operable with said locking means to retain the latter in released position when manually so positioned; and means co-acting with the operating element for rendering said retaining means ineffective when said operating element is displaced from its inoperative position.

2. In a hand brake for railway cars having a brake chain and a rotatable member for tensioning the brake chain, the combination with means for effecting rotation of said member to tension the chain including an element having an operative and inoperative position; of automatically controlled means for normally locking said member against reverse rotation and adapted to be manually operated to release said member; and means cooperable with said locking means to retain the latter in inoperative released position when manually so positioned, said retaining means including an element cooperable with said first named element when the latter is in inoperative position whereby said retaining means hold the locking means inoperative only when said element is in inoperative position.

3. In a hand brake for railway cars having a brake chain, the combination with a rotatable vertical brake staff; automatically controlled means for normally locking said brake staff against reverse rotation and adapted to be manually moved to inoperative released position; means cooperable with said locking means to retain the latter in inoperative released position when manually so positioned; and means for rotating said staff including an operating handle movable toward and from said retaining means, said handle co-acting with the retaining means to actuate the latter to hold the locking means in inoperative released position, when manually so positioned.

4. In a hand brake for railway cars, the combination with a vertical brake staff; of means for rotating said staff including an operating handle, the operating handle having an operative horizontal position and an inoperative vertical position; automatically controlled means for normally locking said staff against reverse rotation and adapted to be manually moved to inoperative released position; and means cooperable with said locking means to maintain the latter in inoperative released position when manually so positioned, said retaining means including an element cooperable with said operating handle only when the latter is in its vertical inoperative position.

5. In a hand brake for railway cars having a brake chain and a rotatable member for tensioning the brake chain, the combination with a pawl and ratchet mechanism for rotating said member to tension the chain, said mechanism including a pivotally mounted handle having a horizontal operative position and a depending vertical inoperative position; of a pivotally mounted locking dog cooperable with the ratchet of said mechanism to hold said member against reverse rotation, said dog being normally automatically held in operative position but adapted to be manually moved to inoperative position; and means cooperable with said dog to hold it in inoperative position when it has been so manually positioned, said retaining means including an element cooperable with said operating handle only when the latter is in its vertical depending position.

6. In a hand brake for railway cars, the combination with a vertical brake staff having a ratchet wheel thereon; of a pawl-carrying pivotally mounted operating handle cooperable with said ratchet wheel to effect rotation thereof, said handle having a horizontal operative position and a depending vertical inoperative position; a spring-controlled locking dog cooperable with said ratchet wheel to hold the staff against reverse rotation; a latch arranged to cooperate with said dog when it is in inoperative position to hold said dog in such position; and means interposed between said latch and the operating handle for projecting said latch into its operative position with respect to the dog when the operating handle is in its depending vertical inoperative position.

7. In a hand brake for railway cars having a brake chain, the combination with a rotatable vertical brake staff; of means for rotating said staff, including an operating handle having operative and inoperative positions; automatically controlled means for normally locking said brake staff against reverse rotation and adapted to be manually moved to inoperative released position; and means cooperable with said locking means to retain the latter in inoperative released position when manually so positioned, said retaining means being rendered inoperative by said locking means when in locking position and by the handle being brought to operative position.

8. In a hand brake for railway cars, the combination with a rotatable vertically extending brake staff; of means, movable in a plane perpendicular to the axis of the staff, for rotating the latter and including an operating handle having both operative and inoperative positions; automatically controlled means, movable in a plane perpendicular to the axis of the staff, for normally locking said brake staff against reverse rotation and adapted to be manually moved to inoperative released position; and means, cooperable with said locking means, to retain the latter in inoperative released position when manually so positioned only while said operating handle is in its inoperative position.

9. In a hand brake for railway cars having a brake chain, the combination with a rotatable vertical brake staff; of means for rotating said staff including an operating handle having operative and inoperative positions; automatically controlled means for normally locking said brake staff against reverse rotation and adapted to be manually moved to inoperative released position; and means controlled by the operating handle, cooperable with said locking means to retain the latter in inoperative released position when manually so positioned and when said handle is in its inoperative position.

10. In a hand brake for railway cars, the combination with a vertical brake staff; of means for rotating said staff including an operating handle, the operating handle having an operative horizontal position and an inoperative vertical position; automatically controlled means for normally locking said staff against reverse rotation and adapted to be manually moved to inoperative released position; and means cooperable with said locking means to maintain the latter in inoperative released position when manually so positioned, said retaining means including an element cooperable with said operating handle only when the latter is in its vertical, inoperative position.

11. In a device of the character described, the combination with a rotatable member; of means for effecting rotation of said member in one direction and including a ratchet wheel; a manually releasable pivoted locking dog normally automatically cooperable with said ratchet wheel to hold the latter against accidental reverse rotation; and an automatically operable latch engageable with said dog, when the latter is manually moved to released position, to hold the latch in released inoperative position with respect to the ratchet wheel.

12. In a device of the character described, the combination with a vertical staff and means for rotating it step by step including a ratchet wheel; of a manually releasable locking dog normally automatically operable to hold said staff against accidental reverse rotation; and a latch, movable automatically to operable position to hold said dog in inoperative position when said dog is manually moved to inoperative position.

In witness that I claim the foregoing I have hereunto subscribed my name this 3rd day of Jan. 1920.

JOHN F. O'CONNOR.

Witness:
CARRIE GAILING.